United States Patent
Fields

(10) Patent No.: US 10,377,198 B1
(45) Date of Patent: Aug. 13, 2019

(54) GLADHAND ELECTRICAL CONNECTIVITY TOWING SYSTEM

(71) Applicant: William R. Fields, Adin, CA (US)

(72) Inventor: William R. Fields, Adin, CA (US)

( * ) Notice: Subject to any disclaimer, the term of this patent is extended or adjusted under 35 U.S.C. 154(b) by 0 days.

(21) Appl. No.: 16/172,928

(22) Filed: Oct. 29, 2018

Related U.S. Application Data

(60) Provisional application No. 62/610,186, filed on Dec. 23, 2017.

(51) Int. Cl.
| | |
|---|---|
| *B60D 1/64* | (2006.01) |
| *B60D 1/60* | (2006.01) |
| *H01R 31/06* | (2006.01) |
| *H01R 13/625* | (2006.01) |

(52) U.S. Cl.
CPC ............. *B60D 1/64* (2013.01); *B60D 1/605* (2013.01); *H01R 13/625* (2013.01); *H01R 31/065* (2013.01); *H01R 2201/26* (2013.01)

(58) Field of Classification Search
CPC .. H01R 13/623; H01R 31/065; H01R 13/447; H01R 31/06; H01R 27/02; B60D 1/64; B60D 1/605

See application file for complete search history.

(56) References Cited

U.S. PATENT DOCUMENTS

| | | |
|---|---|---|
| 2,660,679 A | 11/1953 | Hunt |
| 3,915,476 A | 10/1975 | Burkle |
| 4,792,308 A | 12/1988 | Johnson |
| 5,080,594 A | 1/1992 | Swinford |
| 5,184,960 A | 2/1993 | Hopkins et al. |
| 5,240,271 A * | 8/1993 | Hart ...................... B60T 17/043 137/102 |
| 5,354,204 A | 10/1994 | Hughes |
| 5,514,009 A | 5/1996 | Hughes |
| 5,607,221 A | 3/1997 | Justus |
| 5,626,479 A | 5/1997 | Hughes |
| 5,766,020 A | 6/1998 | Hughes |
| 6,305,945 B1 | 10/2001 | Vance |
| 6,390,824 B1 | 5/2002 | Vance |
| 7,291,017 B1 | 11/2007 | Fain et al. |
| 7,932,623 B2 | 4/2011 | Burlak et al. |
| 7,959,444 B2 | 6/2011 | Corless et al. |
| 8,845,155 B2 | 9/2014 | Rotenberg et al. |

(Continued)

*Primary Examiner* — Briggitte R. Hammond
(74) *Attorney, Agent, or Firm* — Jerry Haynes Law

(57) ABSTRACT

A gladhand electrical connectivity towing system couples electrical wiring from a towing vehicle to a towed vehicle through a quick and easy gladhand coupling operation between a pigtail and a vehicle mount. The system provides a pigtail that detachably couples to a vehicle mount through a tool-free, 20°-25° rotation, gladhand-type connection between male and female gladhand couplers. Two aligning gladhand couplers and one stabilizing gladhand coupler mate. The pigtail and vehicle mount include electrical interfaces that align and engage to conduct electricity from the towing vehicle to the towed vehicle. The electrical interfaces have lips and multiple apertures, with the lips forming a sealed interface to protect against moisture and debris. Multiple first conduction members are fitted into apertures in the electrical interfaces to conduct electricity from the power source of the towing vehicle to the towed vehicle.

20 Claims, 10 Drawing Sheets

(56) References Cited

U.S. PATENT DOCUMENTS

| | | | | |
|---|---|---|---|---|
| 8,932,065 B2* | 1/2015 | Gerling | ................... | B60D 1/64 |
| | | | | 439/35 |
| 9,124,032 B2 | 9/2015 | Arakelian | | |
| 9,258,869 B2 | 2/2016 | Tarr | | |
| 9,647,373 B2* | 5/2017 | O'Neill | ................ | H01R 13/447 |
| 9,751,452 B2 | 9/2017 | Orazem | | |
| 2011/0318951 A1* | 12/2011 | Armacost | ............ | H01R 13/745 |
| | | | | 439/345 |
| 2012/0156896 A1 | 6/2012 | Corless et al. | | |
| 2014/0295683 A1* | 10/2014 | Gette | .................. | H01R 13/453 |
| | | | | 439/137 |
| 2015/0011098 A1 | 1/2015 | Rotenberg et al. | | |
| 2018/0233851 A1* | 8/2018 | Swanepoel | .......... | H01R 13/623 |

* cited by examiner

GLADHAND ELECTRICAL CONNECTIVITY TOWING SYSTEM

CROSS-REFERENCE TO RELATED APPLICATIONS

This application claims the benefits of U.S. provisional application No. 62/610,186, filed Dec. 23, 2017 and entitled ADAPTER, PERMANENT BUMPER MOUNT, AND PIGTAIL ASSEMBLY, which provisional application is incorporated by reference herein in its entirety.

FIELD OF THE INVENTION

The present invention relates generally to a gladhand electrical connectivity towing system. More so, the present invention relates to an electrical connectivity towing system that connects the electrical wiring from a towing vehicle to a towed vehicle by detachably coupling a pigtail to a vehicle mount through a tool-free, 20°-25° rotational, gladhand connection of male and female gladhand couplers, and further aligning and stabilizing the electrical interfaces through the gladhand couplers.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, coupling mechanisms for interfacing the electrical and lighting systems of towing vehicles and their respective towed vehicles require electrical power to be carried from the towing vehicle to the towed vehicle through a wire harness/cable. Most trailer lighting systems operate turn and brake signals. Thus, the electrical interface components that minimize wiring between towing mounts are helpful to interface the two electrical systems, which would otherwise be incompatible.

It is known in the art that the interconnections between vehicles often use threaded connectors that require tools to connect and disconnect. This also requires additional wiring. A gladhand type interconnection is often used with an interlocking hose coupling fitted to hoses supplying pressurized air from a tractor unit to air brakes on a semi-trailer, or from a locomotive to railway air brakes on railroad cars. Such gladhand connectors resemble a pair of hands shaking when interlocked.

Other proposals have involved interconnecting electrical assemblies for towed vehicles. The problem with these tow connection assemblies is that they require tools and are time consuming to couple and decouple. Also, they require numerous wires. Even though the above cited tow connection assemblies meet some of the needs of the market, a gladhand electrical connectivity towing system that connects the electrical wiring from a towing vehicle to a towed vehicle by detachably coupling a pigtail to a vehicle mount through a tool-free, 20°-25° rotation gladhand connection of male and female gladhand couplers, and further aligning and stabilizing the electrical interfaces through the gladhand couplers, is still desired.

SUMMARY

Illustrative embodiments of the disclosure are generally directed to a gladhand electrical connectivity towing system. The electrical connectivity towing system serves to couple electrical wiring from a towing vehicle to a towed vehicle through a quick and easy gladhand coupling operation between a pigtail and a vehicle mount. The electrical connectivity towing system provides a pigtail that detachably couples to a vehicle mount through a tool-free, 20° rotation, gladhand-type connection between male and female gladhand couplers. The pigtail and vehicle mount include disc-shaped electrical interfaces that align and engage to conduct electricity from the towing vehicle to the towed vehicle. Aligning gladhand couplers align the pigtail and vehicle mount for coupling. Stabilizing gladhand couplers help stabilize the pigtail and vehicle mount while coupled.

In one embodiment the electrical connectivity towing system comprises a pigtail comprising a first tongue, a first open end, and a first coupling end. The first coupling end is defined by a first flanged inner perimeter and a first outer perimeter. The first outer perimeter forms multiple aligning female gladhand couplers and at least one stabilizing female gladhand coupler.

The electrical connectivity towing system further comprises a first electrical interface defined by a first lip and multiple first apertures, the first lip forming a sealed interface with the first flanged inner perimeter. Multiple first conduction members are fitted into the first apertures for conducting electricity.

The electrical connectivity towing system further comprises a vehicle mount comprising a second tongue, a second open end, and a second coupling end. The second coupling end is defined by a second flanged inner perimeter and a second outer perimeter. The second outer perimeter forms multiple aligning male gladhand couplers and at least one stabilizing male gladhand coupler.

The pigtail interlocks with the vehicle mount when the aligning male gladhand couplers and the aligning female gladhand couplers are aligned, and when the aligning female gladhand couplers are rotated in a first direction until the stabilizing female gladhand coupler mates with the stabilizing male gladhand coupler.

The electrical connectivity towing system further comprises a second electrical interface defined by a second lip and multiple second apertures. The second lip forms a sealed interface with the second flanged inner perimeter. Multiple second conduction members fitted into the second apertures. The first and second conduction members align when the pigtail and the vehicle mount interlock through the gladhand interconnection.

In another aspect, the pigtail comprises two aligning female gladhand couplers and one stabilizing female gladhand coupler.

In another aspect, the two aligning female gladhand couplers are disposed proximal to the first tongue.

In another aspect, the vehicle mount comprises two aligning male gladhand couplers and one stabilizing male gladhand coupler.

In another aspect, the two aligning male gladhand couplers are disposed proximal to the second tongue.

In another aspect, the pigtail interlocks with the vehicle mount when the aligning female gladhand couplers are rotated about twenty degrees in the first direction until the stabilizing female gladhand coupler mates with the stabilizing male gladhand coupler.

In another aspect, the pigtail disengages from the vehicle mount when the aligning female gladhand couplers are rotated about twenty degrees in a second direction until the stabilizing female gladhand coupler disengages from the stabilizing male gladhand coupler.

In another aspect, the first and second electrical interfaces are defined by a disc-shape.

In another aspect, the multiple first electrical interfaces comprises seven first electrical interfaces.

In another aspect, the multiple second electrical interfaces comprises seven second electrical interfaces.

In another aspect, the system further comprises a first cap mating with the first outer perimeter to cover the first electrical interface.

In another aspect, the system further comprises a second cap mating with the second outer perimeter to cover the second electrical interface.

In another aspect, the first and second conduction members comprise brass bolts.

In another aspect, the system further comprises multiple nuts that couple to the brass bolts.

In another aspect, the system further comprises a mounting plate attached to the second open end of the second tongue, and a mounting bolt fastening the mounting plate to a towed vehicle.

In another aspect, the system further comprises a cable for carrying electrical current from the electrical power source, through the first electrical interface, through the second electrical interface, to the towed vehicle.

One objective of the present invention is to connect electrical wiring between a towing vehicle and a towed vehicle through a gladhand connection that easily couples and decouples through a tool-free, between a 20° to 25° (or 22.5°) rotation.

Another objective is to enable tool-free connections and disconnections of between a towing vehicle and a towed vehicle through a 22.5° rotation of the vehicle mount relative to the pigtail in a first direction to interlock the vehicles; and a 22.5° rotation of the vehicle mount relative to the pigtail in a second direction to disengage the vehicles.

Another objective is to convert a current SAE J560 female receptacle, typically found on the bumper of most pickup trucks, with the pigtail and vehicle mount, without requiring a rewiring of the pickup truck to accommodate a first coupling end.

Another objective is to provide an easy fix; whereas a prior art bumper mount requires more effort to install.

Another objective is to provide two aligning gladhand couplers outside the perimeters of the pigtail and the vehicle mount that provide visual alignment of the electrical interfaces inside the pigtail and the vehicle mount.

Yet another objective is to provide a stabilizing gladhand coupler to stabilize the gladhand connection between the pigtail and the vehicle mount.

Yet another objective is to reduce wiring by using disc-shaped electrical interfaces to carry electrical current between the towing mounts, and to reduce the amount of corrosion to electrical components.

Yet another objective is to provide an inexpensive to manufacture and easy to operate gladhand electrical connectivity towing system.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A gladhand electrical connectivity towing system 100 is referenced in FIGS. 1-11. As referenced in FIG. 1, the gladhand electrical connectivity towing system 100, and hereafter "system 100" is configured to carry electrical power from a power source of a towing vehicle, to a towed vehicle through a wire subassembly 124. The wire subassembly 124 runs through a pigtail 102 that forms a gladhand interconnection and electrical connectivity with a vehicle mount 108. In essence, the pigtail 102 is a permanent set of wires from a towing vehicle, while the vehicle mount 108 is permanently attached to the towed vehicle.

Figure 2:
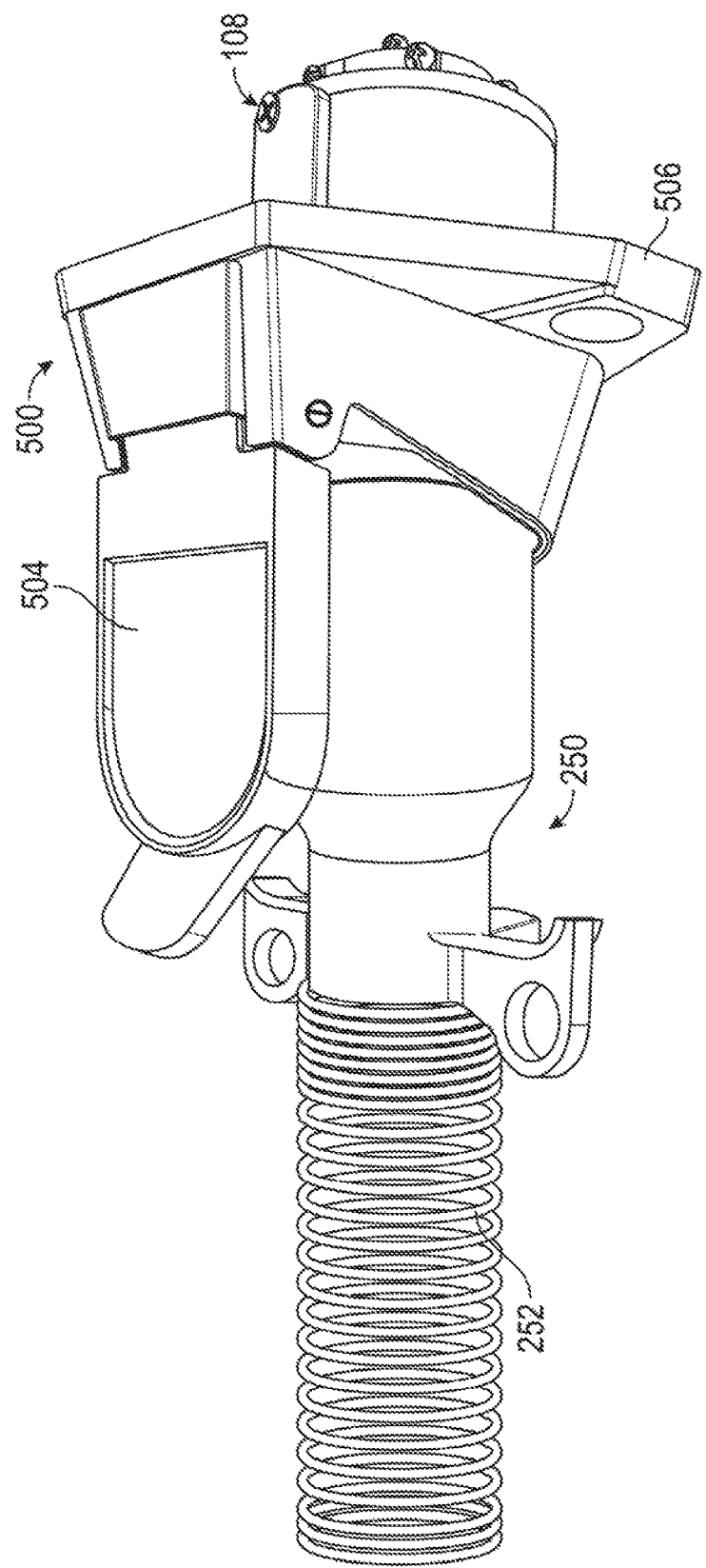
FIG. 2 illustrates a perspective view of a prior art J-560 Plug carrying electrical connectivity and mated with the vehicle mount, in accordance with an embodiment of the present invention.

FIG. 2 illustrates a perspective view of a prior art J-560 plug 250 carrying electrical connections 252 and mated with the vehicle mount 108. Those skilled in the art will recognize that the J-560 plug helps establish a secure connection between a trailer and a semi or other tow vehicle through use of a heavy-duty, 7-pole plug. The electrical connection 252 of the J-560 plug 250 has round brass pins to ensure minimum voltage drop and pull grips for easy insertion and removal. A gated housing, described below, encapsulates the J-560 plug 250 and the vehicle mount 108, providing protection from moisture, and stabilizing the older system while carrying the towing vehicle.

Figure 1:
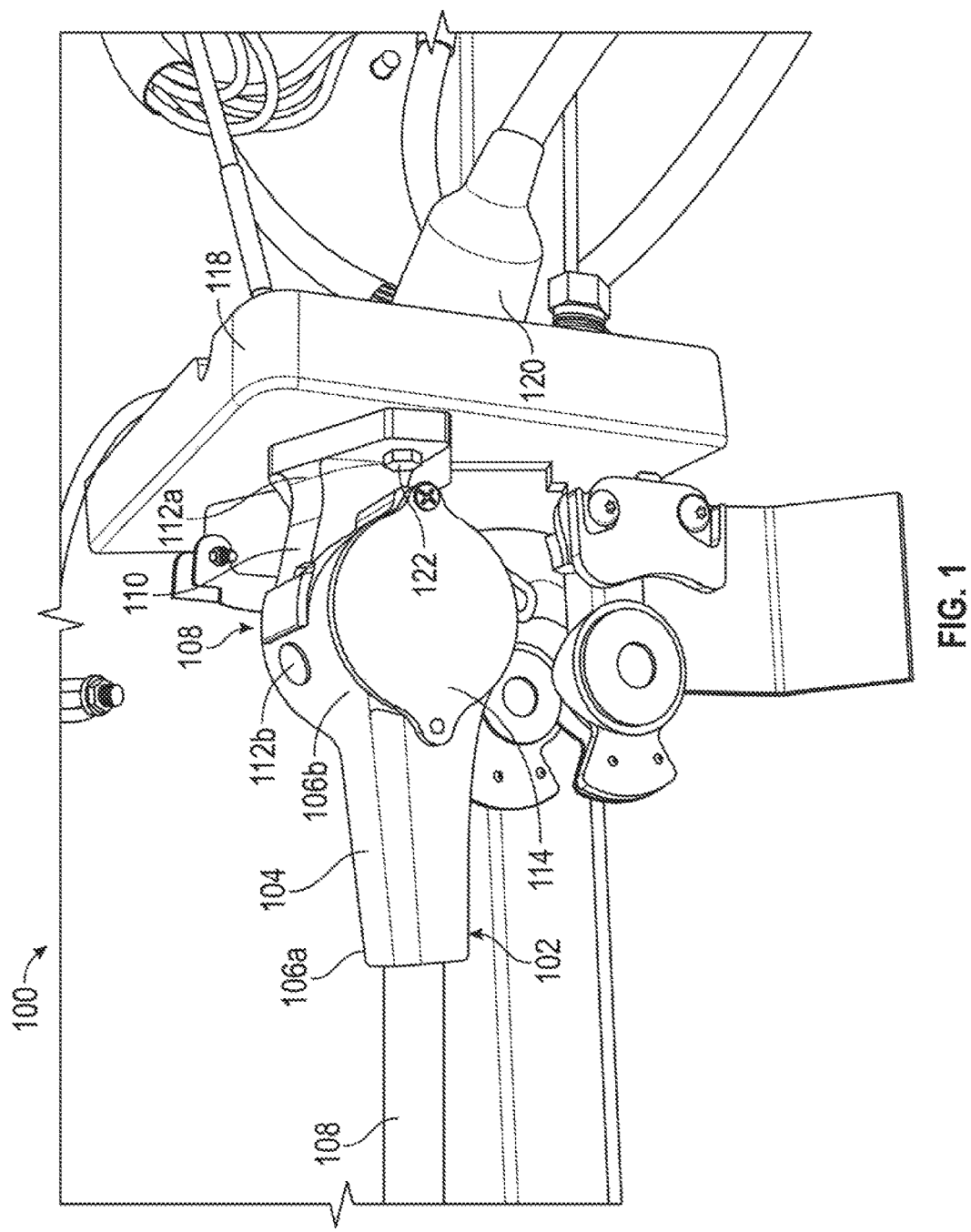
FIG. 1 illustrates a perspective view of an exemplary gladhand electrical connectivity towing system, connecting a towing vehicle and towed vehicle, in accordance with an embodiment of the present invention.

The present invention essentially replaces the J-560 plug 250 and electrical connections 252 therein, with a pigtail 102 and wire subassembly 124. This creates a new "FES" system without having to remove the vehicle mount and install the "FES" Bumper Mount. Thus, FIG. 1 shows the conversion from the old J-560 to the new "FES" connection, which creates a novel adapter for towing vehicles, trailers, trucks, and the like.

As discussed above the gladhand connection between the pigtail 102 and vehicle mount 108 enables quick-connect/disconnect mating with a towed vehicle. In some embodiments, the towed vehicle may include, without limitation, a trailer, an airplane, a boat, and a nonoperational vehicle. The towing vehicle may include, without limitation, a truck, a semi, and a tug boat. In any case, electricity is supplied from a power source, i.e. battery, in the towing vehicle for lighting or other electrical functions in the towed vehicle, through use of the gladhand-coupled pigtail 102 and vehicle mount 108.

This unique mechanical and electrical coupling between pigtail 102 and vehicle mount 108 is accomplished through a gladhand-type interconnection that enables a small rotational motion of about 20° to couple and decouple. Specifically, the pigtail 102 detachably couples to the vehicle mount 108 through a tool-free, 20° rotation, gladhand-type connection between male and female gladhand couplers 200*a-c*, 212*a-c*. Aligning gladhand couplers 200*a-b*, 212*a-b* work to align, and separate stabilizing gladhand couplers 200*c*, 212*c* work to stabilize the coupled pigtail 102 and vehicle mount 108.

The system 100 also utilizes disc-shaped electrical interfaces 214, 218 that are seal-fitted into the pigtail 102 and vehicle mount 108. The electrical interfaces 214, 218 align and engage when the pigtail 102 and vehicle mount 108 couple, so as to conduct electricity from the towing vehicle, to the towed vehicle. The electrical interfaces are studded with electrically conduction members 206*a-i*, 208*a-h* fitted to their respective pigtail 102 and vehicle mount 108 to carry electricity from the towing vehicle power source to the towed vehicle for lighting. The direct interface between electrical interfaces 214, 218 minimizes the necessary wiring to carry electrical power from the towing vehicle power source to the towed vehicle. In one non-limiting embodiment, the system 100 utilizes multi-pole or blade-style switches at the electrical interfaces 214, 218.

In one exemplary use of system, the unique gladhand connection between pigtail 102 and vehicle mount 108, and the resultant alignment of electrical interfaces 214, 218, can be used in lieu of a current SAE J560 female receptacle, typically found on the bumper of pickup trucks. This simple coupling mechanism easily connects through a simple 20° rotation that negates the need for coupling tools or for rewiring the towing vehicle, i.e., pickup truck. In this manner, the system 100 is an easy fix; whereas a prior art bumper mount requires more effort to install.

Figure 3:
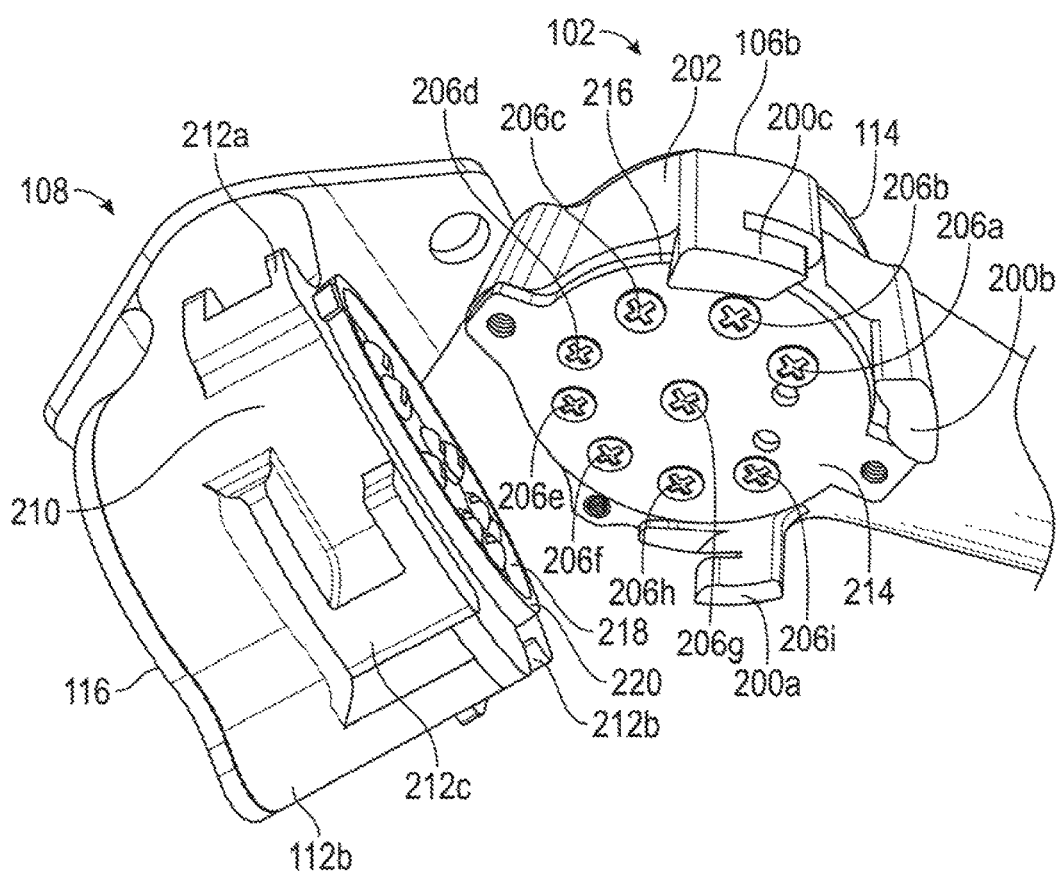
FIG. 3 illustrates a perspective view of an exemplary pigtail and vehicle mount decoupled from each other, in accordance with an embodiment of the present invention.

As FIG. 3 references, the system 100 comprises a pigtail 102 that carries the wire subassembly 124 from a towing vehicle power source. The pigtail 102 comprises an elongated first tongue 104. In one non-limiting embodiment, the first tongue 104 has a length of about 2". In another embodiment, the first tongue 104 is hollow, carrying the wire subassembly 124 from the towing vehicle. The wire subassembly 124 may include, without limitation, a wire harness, a ground, a positive wire, and a negative wire.

In one non-limiting use, the pigtail 102 couples to the standard J-560 plug 250 discussed above. This negates the need to rewire the J-560 receptacle when connecting to the towed vehicle. Thus, the pigtail 102 allows for the conversion of the J-560 receptacle to the "Fields Electrical System". The electrical configuration of the pigtail 102 and/or the J-560 receptacle may include multi-pole or blade-style switches. In some embodiments, the pigtail 102 may be fabricated from molded pot metal, molded ABS plastic, or fabricated by means of CNC milling from aircraft grade aluminum.

Figure 4:
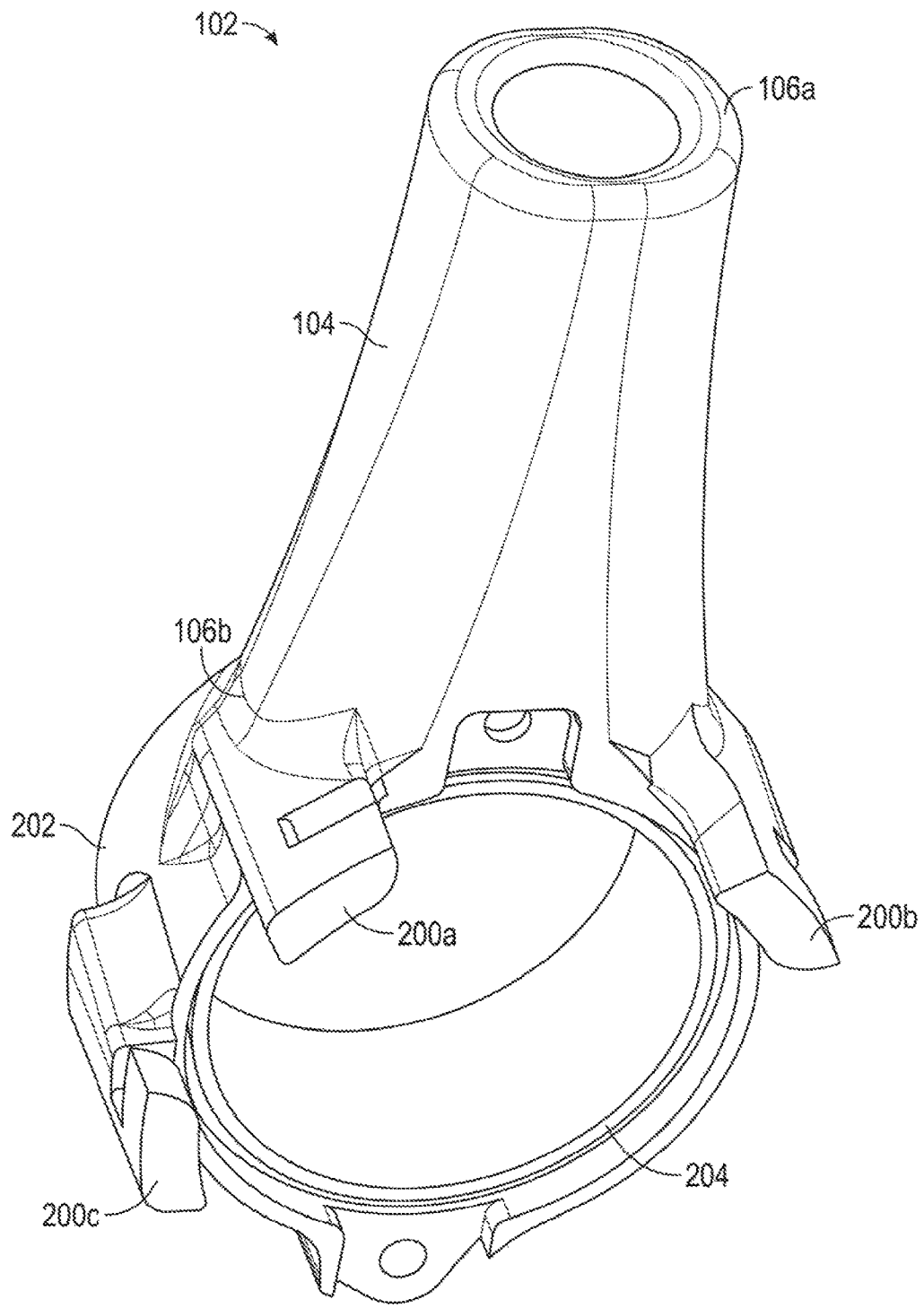
FIG. 4 illustrates a perspective view of the pigtail, in accordance with an embodiment of the present invention.

Turning now to FIG. 4, the first tongue 104 extends and terminates at a first open end 106*a*. The first tongue 104 further comprises a first coupling end 106*b*, opposite the first open end 106*a*. The first open end 106*a* of the pigtail 102 is oriented towards the towing vehicle, while the first coupling end 106*b* is oriented towards the towed vehicle. In some embodiments, the first coupling end 106*b* has a diameter of about 1½".

In some embodiments, the first coupling end 106*b* is defined by a first flanged inner perimeter 204 and a first outer perimeter 202. The perimeters 202, 204 may be defined by a ring shape. The first outer perimeter 202 forms multiple aligning female gladhand couplers 200*a*, 200*b* and at least one stabilizing female gladhand coupler 200*c*. The couplers 200*a-c* are integral, and protrude from the first outer perimeter 202.

In one embodiment, the two aligning female gladhand couplers 200*a-b* are proximal to the first tongue 104, and used as a visual indication of alignment between the first and second electrical interfaces 214, 218; or more specifically the first and second apertures 402*a-f* that form therein. In another embodiment, one stabilizing female gladhand coupler 200*c* forms opposite and distally from the first tongue 104. The stabilizing female gladhand coupler 200*c* is used to stabilize the gladhand connection between the pigtail 102 and the vehicle mount 108.

Figure 5:
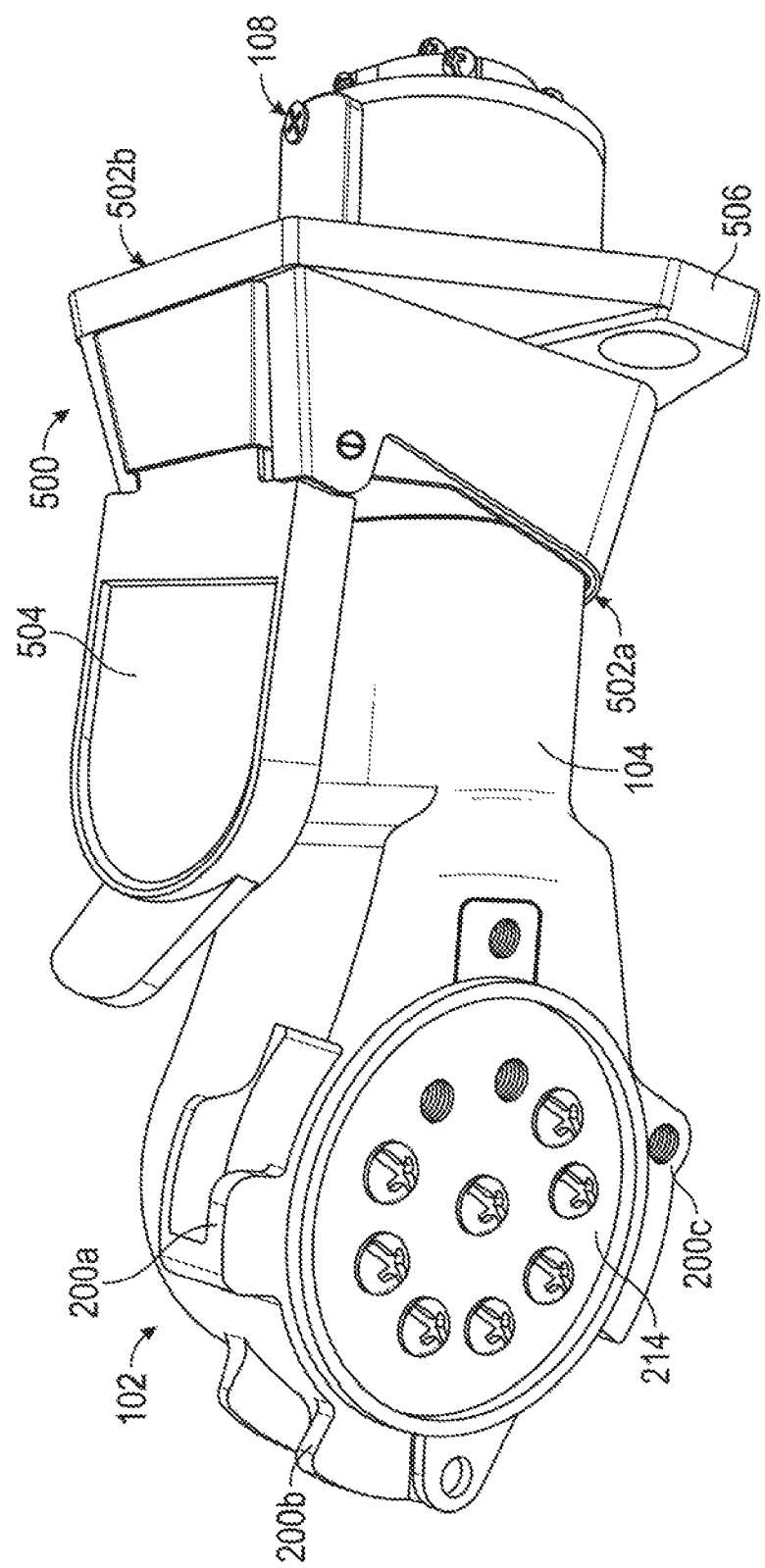
FIG. 5 illustrates a perspective view of a gated housing that encapsulates the gladhand connection between the pigtail and vehicle mount, in accordance with an embodiment of the present invention.

FIG. 5 illustrates a perspective view of a gated housing 500 that encapsulates the gladhand connection between the pigtail 102 and vehicle mount 108. The gated housing can be adjusted axially along the gladhand connection. This prevents moisture and debris from entering the space between the gladhand connection of the pigtail 102 and the vehicle mount 108. The gated housing 500 has a cylindrical shape with two opposing open ends 502a, 502b. Though in other embodiments, the gated housing 500 is shaped to accommodate variously sized and shaped pigtails and vehicle mounts.

One open end 502a oriented towards the pigtail includes a hinged gate 504 that pivots outwardly to enable passage of the pigtail. The second open end 502b includes an apertured flange 506 that enables fasteners to anchor the gated housing 500 to the vehicle bumper. This anchoring means creates stability for the towing system 100. Those skilled in the art will recognize that heavier loads cause lateral and axial stress on the gladhand connection. The gated housing helps alleviate this stress. In one non-limiting embodiment, the hinged gate 504 opens and closes with stainless steel spring. In another embodiment, a bottom lip extends from the first open end 502a for better plug support through a 2-hole mounting style.

Figure 6:
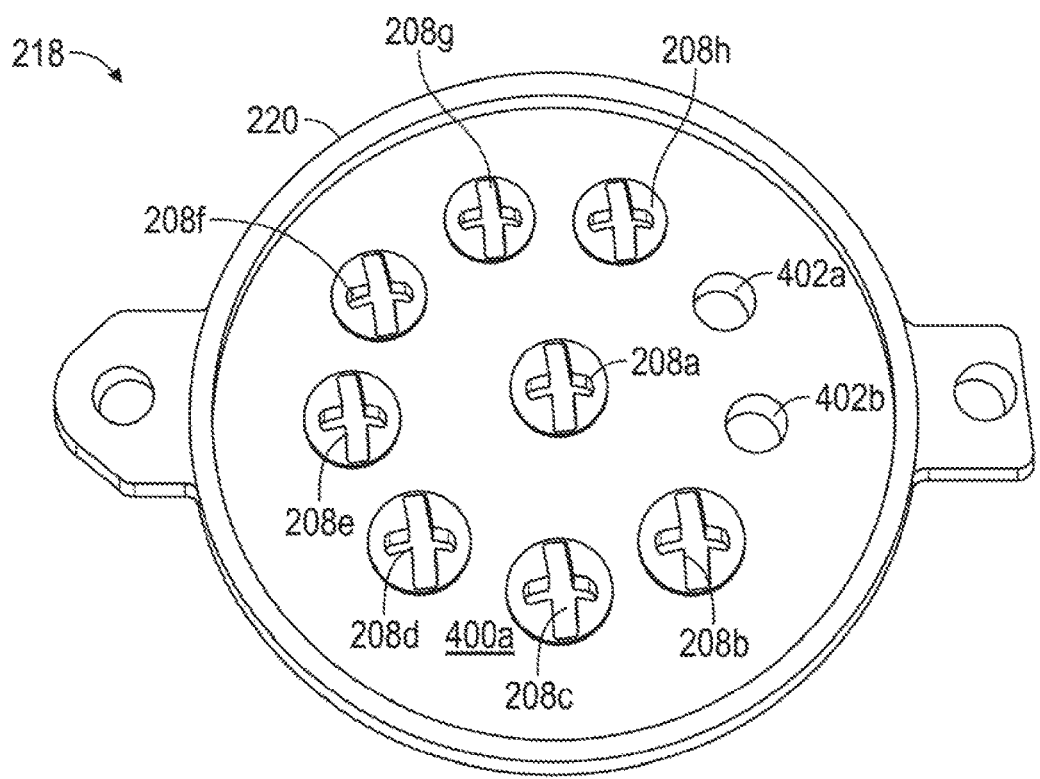
FIG. 6 illustrates a top view of an exemplary electrical interface studded with conduction members, in accordance with an embodiment of the present invention.

Turning now to FIG. 6, the system 100 further comprises a first electrical interface 214 that is operable with the pigtail 102 for conducting electricity from the wire subassembly 124. The first electrical interface 214 is defined by a disc-shape having an integral first lip 216 at the edges. The first electrical interface 214 is further defined by an upper side 400a and a lower side 400b, with the first lip 216 protruding from the upper side 400a.

In some embodiments, the first electrical interface 214 may include a 12 volt electrical circuit disk board. Though in other embodiments, the first electrical interface 214 may take other shapes, dimensions, and have greater or lesser number of first apertures 402a-f. In some embodiments, the first electrical interface 214 has a diameter between 1.5" to 2", and a thickness of about ⅛".

The first lip 216 of the first electrical interface 214 is configured to form a sealed interface with the first flanged inner perimeter 204 of the pigtail 102. This helps inhibit moisture and dirt from entering the first tongue 104. In one non-limiting embodiment, an O-ring may be placed along the first flanged inner perimeter 204 of the first coupling end 106b to inhibit moisture from engaging the first electrical interface 214.

In some embodiments, the first electrical interface 214 forms multiple evenly spaced first apertures 402a-f. The first apertures are circular and configured to receive multiple first conduction members 206a-i, such as brass bolts or other conductive fasteners known in the art. The conduction members and apertures may include seven or more apertures and conduction members. Though in other embodiments, any number or size of first apertures and conduction members may be used, depending on wiring requirements.

Looking again at FIG. 3, multiple first conduction members 206a-i are fitted into the first apertures 402a-f of the first electrical interface 214 for conducting electricity. The first conduction members 206a-i form an electrical conductive transfer of electricity with the second conduction members 208a-h in the second electrical interface 218 of the vehicle mount 108, as discussed below. The first conduction members 206a-i may include conductive members, such as brass bolts and nuts, which conduct electricity through the first electrical interface 214.

In one non-limiting embodiment, seven first apertures 402a-f receive seven conduction members. This can include a 7-pole electrical configuration. Though other electrical configurations may be used. In another embodiment, the first conduction members 206a-i comprise brass bolts that are fastened into the first apertures 402a-f with nuts. The metal composition of the bolts and nuts enables electrical conductivity through the first electrical interface 214.

Figure 7:
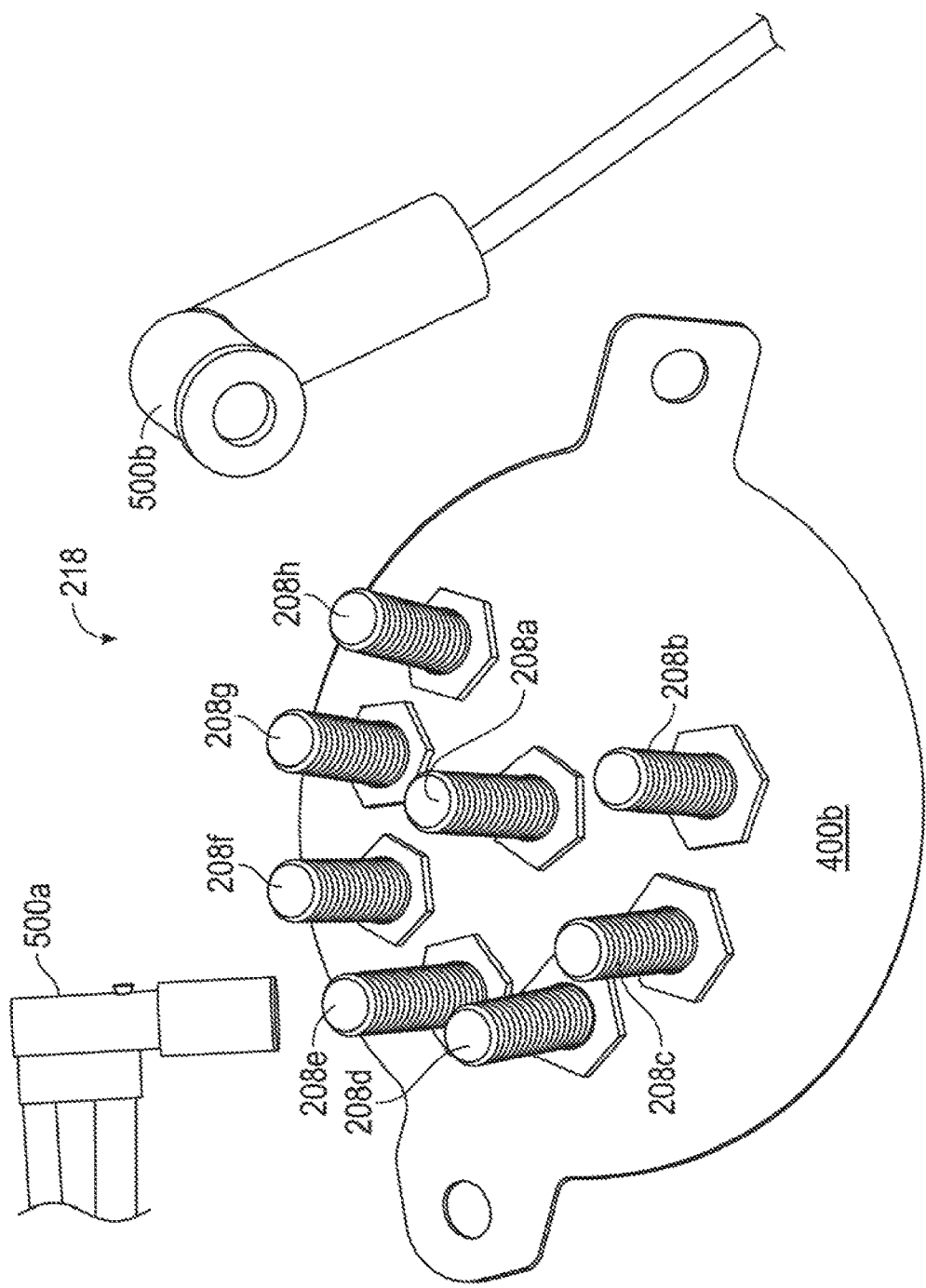
FIG. 7 illustrates a bottom view of an exemplary electrical interface studded with conduction members, and a wrench for fastening nuts to the conduction members, in accordance with an embodiment of the present invention.

As FIG. 7 shows, the first conduction members 206a-i fasten into the first apertures 402a-f. In one possible embodiment, push-on type connectors may be used to connect the first conduction members 206a-i to the first apertures 402a-f. This may include, without limitation, a molded connector with the wire pre-attached, and a spade connector to attach to the push-on connector. Though, the wire connectors can be configured in other arrangements known in the art. In this one exemplary embodiment, after the first conduction members 206a-i are fastened in their respective apertures, the press on wire terminal, or other wire connectivity means, connects to the first conduction members 206a-i to carry electricity from the towing vehicle. In one embodiment, the terminals may have variations of sizes to accommodate the power source and a hot line from the power source, which may include a 10 or 12 gauge wire. Further, the first apertures 402a-f can be sized and dimensioned to accommodate different wire sizes.

In some embodiments, a first cap 114 mates with the first outer perimeter 202 to cover the first electrical interface 214. The first cap is flat, rigid, and has a circular perimeter that seals with the first outer perimeter 202. Screws or other fasteners can also be used to fasten the first cap 114 to the pigtail 102. This may also include a snap-fit mating configuration, or a screw that bolts the first cap 114. In any case, the first cap 114 helps prevent debris and moisture from entering the first tongue 104 of the pigtail 102. The first cap 114 is especially useful for protecting the electrical components and cable 120 from the towing vehicle passing through the first tongue 104.

Figure 8:
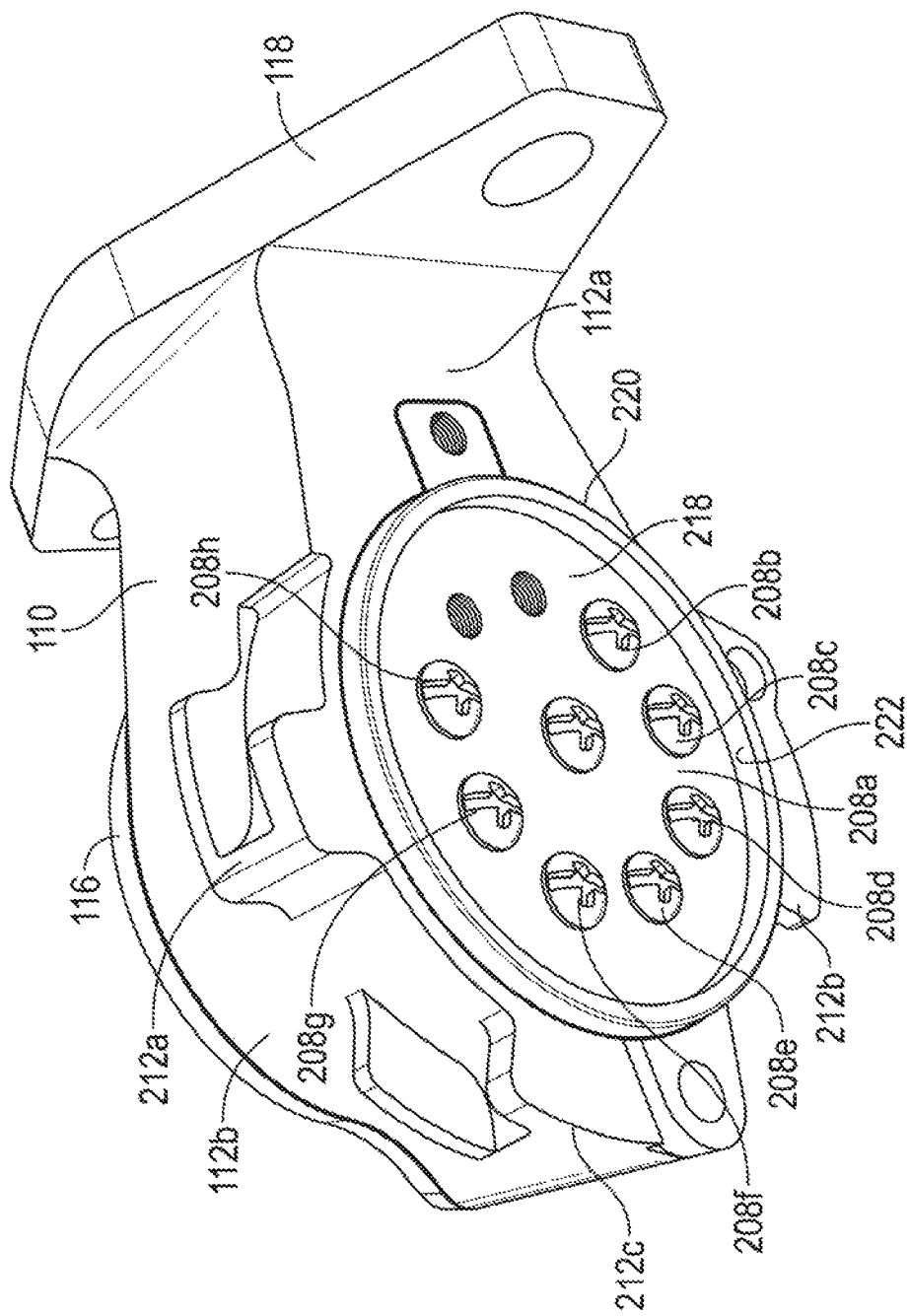
FIG. 8 illustrates a perspective view of the vehicle mount with attached electrical interface, in accordance with an embodiment of the present invention.

As illustrated in FIG. 8, the system 100 further comprises a vehicle mount 108 that couples to the pigtail 102, carrying electricity to the towed vehicle. The vehicle mount 108 comprises a second tongue 110 that extends and terminates at a second open end 112a and a second coupling end 112b. The second tongue 110 is hollow and carries wiring to the towed vehicle for electrical uses, such as lighting, brakes, and other uses known in the art. In some embodiments, the vehicle mount 108 may be fabricated from molded pot metal, molded ABS plastic, or fabricated by means of CNC milling from aircraft grade aluminum.

The second tongue 110 terminates at a second open end 112a that orients towards the towed vehicle. The second tongue 110 has an oppositely oriented second coupling end 112b that orients towards the towing vehicle. The second coupling end 112b is defined by a second flanged inner perimeter 222 and a second outer perimeter 210. The second perimeters, similar to the first perimeters, may have a ring shape. The second outer perimeter 210 forms multiple aligning male gladhand couplers and at least one stabilizing male gladhand coupler. The couplers are integral, and protrude from the second outer perimeter 210.

In one embodiment, two aligning male gladhand couplers 212a, 212b are proximal to the second tongue 110 and used to align the second electrical interface 218. In another embodiment, one stabilizing male gladhand coupler 212c forms opposite and distally from the second tongue 110. The stabilizing male gladhand coupler 212c is used to stabilize the gladhand connection between the pigtail 102 and the vehicle mount 108.

The electrical connectivity towing system 100 further comprises a second electrical interface 218 that is similar to the first electrical interface 214. The second electrical interface 218 is defined by a disc-shape that forms an integral second lip 220 at the edges. The second electrical interface 218 also forms multiple evenly spaced second apertures. The second lip 220 forms a sealed interface with the second flanged inner perimeter 222. This helps inhibit moisture and dirt from entering the second tongue 110. In one possible embodiment, an O-ring may be placed along the second flanged inner perimeter 222 of the second flanged inner perimeter 222 to inhibit moisture from entering the second tongue 110, or engaging the second disc-shaped electrical interface; thereby forming a moisture seal for the vehicle mount 108.

In some embodiments, a second cap 116 mates with the second outer perimeter 210 to cover the second electrical interface 218. This may include a snap-fit mating configuration, or a screw that bolts the second cap 116 onto the vehicle mount 108. In any case, the second cap 116 helps prevent debris and moisture from entering the second tongue 110 of the vehicle mount 108. The second cap 116 is especially useful for protecting the electrical components and cable 120 passing through the second tongue 110.

Multiple second conduction members 208a-h are fitted into the second apertures. In one non-limiting embodiment, seven second apertures receive seven conduction members. In another embodiment, the second conduction members 208a-h comprise brass bolts that are fastened into the second apertures with nuts. The metal composition of the bolts and nuts enables electrical conductivity through the second electrical interface 218.

Figure 11:
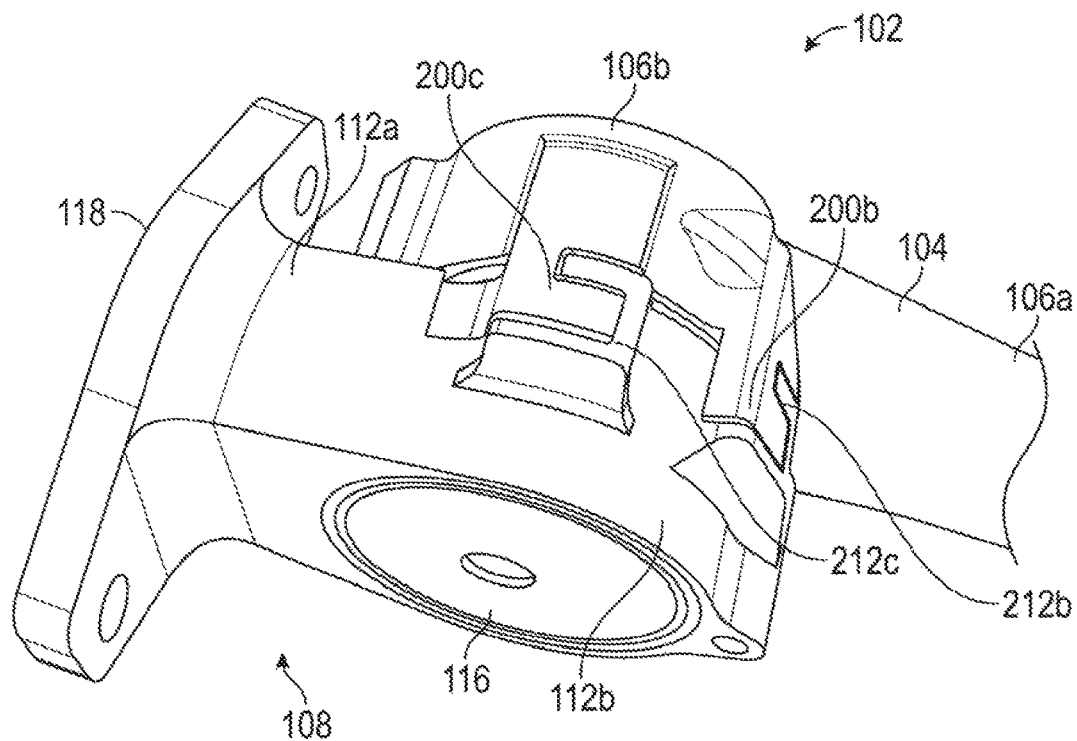
FIG. 11 illustrates a perspective view of the pigtail coupled to the vehicle mount, showing the gladhand couplers mated together, in accordance with an embodiment of the present invention.

When aligned with the first conduction members 206a-i the electricity is carried to the towed vehicle. The first and second conduction members 206a-i, 208a-h align when the pigtail 102 and the vehicle mount 108 interlock through the gladhand interconnection. As illustrated in FIG. 11, a 22.5° rotation in the first direction, showing the conduction members 206a-i in the first electrical interface 214 align with the second conduction members. This alignment of conduction members creates conductivity to in the first direction allows the first conduction members 206a-i in the first and second conduction members 206a-i, 208a-h enables current flow for the electricity to travel from the power source in the towing vehicle to the towed vehicle.

Figure 10:
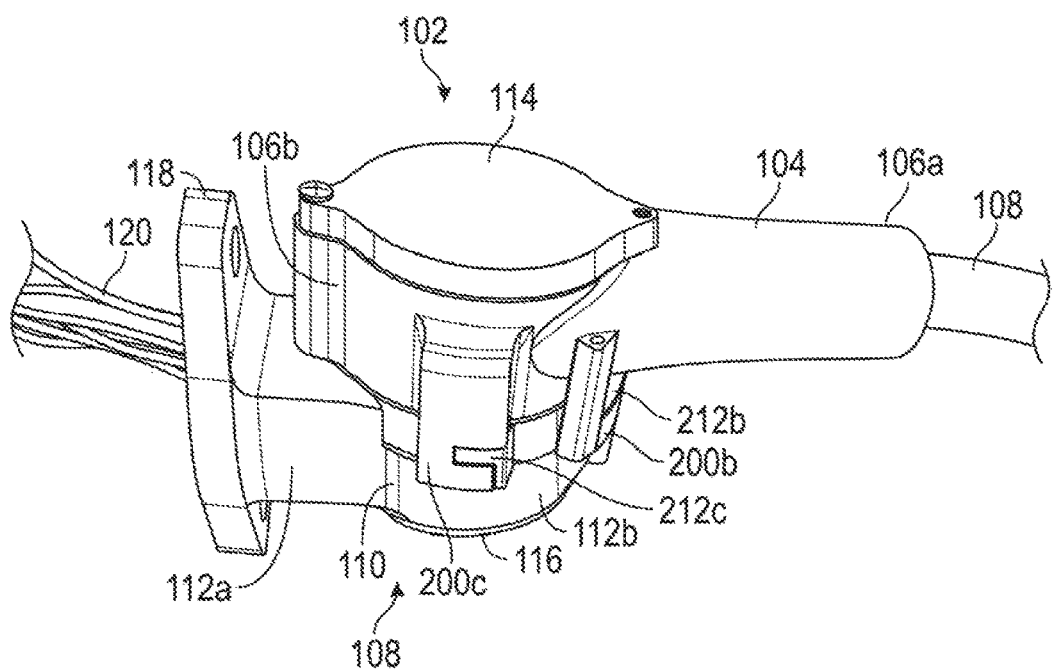
FIG. 10 illustrates a perspective view of the pigtail coupled to the vehicle mount, in accordance with an embodiment of the present invention.

Looking at FIG. 10, the pigtail interlocks with the vehicle mount 108 in a gladhand relationship that is manually engaged and disengaged through a rotation between 20°-24°; or in one embodiment—22.5°. This interlocking configuration occurs when the respective electrical interfaces 214, 218 in the pigtail 102 and vehicle mount 108 are aligned; and then the female and male gladhand couplers 200a-c, 212a-c rotated to firmly mate in a male-female interconnection. Thus, in operation, the aligning female gladhand couplers 200a-b and the aligning male gladhand couplers 212a-b are aligned through use of the aligning gladhand couplers. This indicates that the first and second electrical interface 218 are oriented correctly for engaging, and thereby conducting electricity. Next, the female gladhand couplers are rotated in a first direction until the stabilizing female gladhand coupler 200c mates with the stabilizing male gladhand coupler 212c. This extra stabilization provided by the third coupler 200c, 212c is vital to strengthening the connection between the pigtail 102 and the vehicle mount 108. This can be useful when towing heavier vehicles, or in rough terrain, or bad weather conditions.

Figure 9:
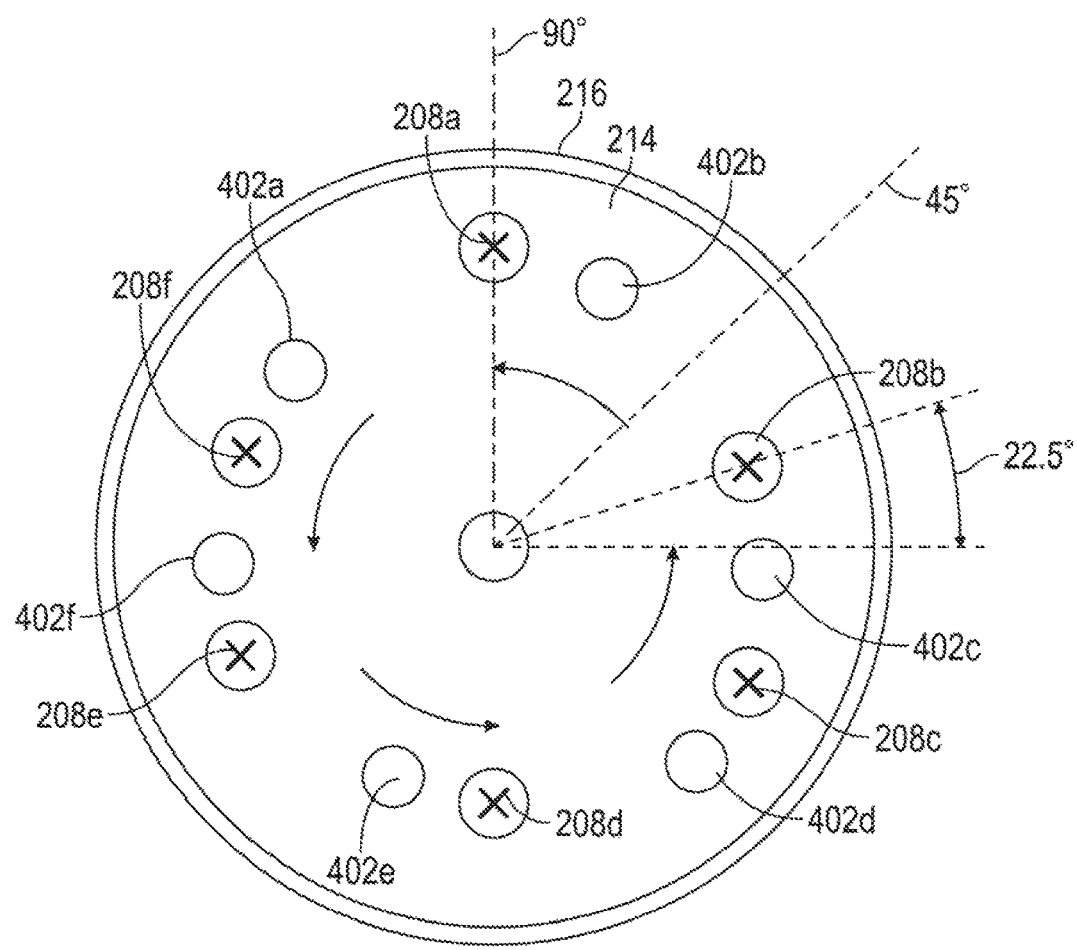
FIG. 9 illustrates a top view of the first electrical interface rotating 22.5 degrees to align with the second electrical interface conducting members, in accordance with an embodiment of the present invention.

In one non-limiting embodiment shown in FIG. 9, the connecting rotation is about 22.5° in the clockwise direction, such that rotating the pigtail 102 22.5° in the first direction causes the female gladhand couplers 200a-c to snugly mate with the male gladhand couplers 212a-c of the vehicle mount 108. To disengage the pigtail 102 from the vehicle mount 108, the female gladhand couplers 200a-c are rotated the same 22.5° in the second direction, and then pulled apart from the male gladhand couplers 212a-c.

As FIG. 11 illustrates, the system 100 further comprises a mounting plate 118 attached to the second open end 112a of the second tongue 110. A mounting bolt 122 may be used to attach the mounting plate 118 to a towed vehicle bumper of the towed vehicle. The system 100 may also include a cable 120 for carrying electrical current from the electrical power source, through the first electrical interface 214, through the second electrical interface 218, and finally to the towed vehicle.

In operation, the wire subassembly 124 carries electricity from the towing vehicle power source and passes through the first tongue 104 of the pigtail 102 before engaging the first conductive members 206a-i in the first electrical interface 214. The first outer perimeter 202 of the pigtail 102 is oriented to face the second outer perimeter 210 of the vehicle mount 108. The aligning female gladhand couplers 200a-c of the pigtail 102 are aligned with, and engaged in a parallel disposition to the aligning male gladhand couplers 212a-c of the vehicle mount 108.

Next, the pigtail 102 is rotated in the first (clockwise) direction about 22.5°, until the aligning gladhand couplers 200a-b, 212a-b, and the stabilizing gladhand couplers 200c, 212c are snugly mated. At this junction the first and second conduction members 206a-i, 208a-h are engaged and conducting electricity from the towing vehicle power source to the towed vehicle. Also, the mechanical relationship helps maintain connectivity between the towing and towed vehicles. To disengage the pigtail 102 from the vehicle mount 108, the pigtail 102 is rotated in the second direction, about 22.5°, until the aligning gladhand couplers 200a-b, 212a-b, and the stabilizing gladhand couplers 200c, 212c are disengaged.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A gladhand electrical connectivity towing system, the system comprising:
   a pigtail comprising a first tongue, a first open end, and a first coupling end, the first coupling end being defined by a first flanged inner perimeter and a first outer perimeter, the first outer perimeter forming multiple aligning female gladhand couplers and at least one stabilizing female gladhand coupler;
   a first electrical interface defined by a first lip and multiple first apertures, the first lip forming a sealed interface with the first flanged inner perimeter;
   multiple first conduction members fitted into the first apertures;
   a vehicle mount comprising a second tongue, a second open end, and a second coupling end, the second coupling end being defined by a second flanged inner perimeter and a second outer perimeter, the second outer perimeter forming multiple aligning male gladhand couplers and at least one stabilizing male gladhand coupler, whereby the pigtail interlocks with the vehicle mount when:
the aligning male gladhand couplers and the aligning female gladhand couplers are aligned, and
when the aligning female gladhand couplers are rotated in a first direction until the stabilizing female gladhand coupler mates with the stabilizing male gladhand coupler;
a second electrical interface defined by a second lip and multiple second apertures, the second lip forming a sealed interface with the second flanged inner perimeter; and
multiple second conduction members fitted into the second apertures,
whereby the first and second conduction members align when the pigtail and the vehicle mount interlock.

2. The system of claim 1, wherein the pigtail comprises two aligning female gladhand couplers and one stabilizing female gladhand coupler.

3. The system of claim 2, wherein the two aligning female gladhand couplers are disposed proximal to the first tongue.

4. The system of claim 3, wherein the vehicle mount comprises two aligning male gladhand couplers and one stabilizing male gladhand coupler.

5. The system of claim 4, wherein the two aligning male gladhand couplers are disposed proximal to the second tongue.

6. The system of claim 1, wherein the pigtail interlocks with the vehicle mount when the aligning female gladhand couplers are rotated between twenty degrees and twenty four degrees in the first direction until the stabilizing female gladhand coupler mates with the stabilizing male gladhand coupler.

7. The system of claim 6, wherein the pigtail disengages from the vehicle mount when the aligning female gladhand couplers are rotated between twenty degrees and twenty four degrees in a second direction until the stabilizing female gladhand coupler disengages from the stabilizing male gladhand coupler.

8. The system of claim 1, wherein the first and second electrical interfaces are defined by a disc-shape.

9. The system of claim 1, wherein the multiple first electrical interfaces comprises seven first electrical interfaces.

10. The system of claim 1, wherein the multiple second electrical interfaces comprises seven second electrical interfaces.

11. The system of claim 1, further comprising a first cap mating with the first outer perimeter to cover the first electrical interface.

12. The system of claim 1, further comprising a second cap mating with the second outer perimeter to cover the second electrical interface.

13. The system of claim 1, wherein the first and second conduction members comprise brass bolts.

14. The system of claim 13, further comprising multiple nuts that couple to the brass bolts.

15. The system of claim 1, further comprising a mounting plate attached to the second open end of the second tongue, and a mounting bolt fastening the mounting plate to a towed vehicle.

16. The system of claim 15, further comprising a cable for carrying electrical current from the electrical power source, through the first electrical interface, through the second electrical interface, to the towed vehicle.

17. The system of claim 1, further comprising a gated housing encapsulating the gladhand connection between the pigtail and vehicle mount, the gated housing defined by a first open end and an opposing second open end, the first open end comprising a hinged gate, the second open end comprising an aperture flange.

18. A gladhand electrical connectivity towing system, the system comprising:
a pigtail comprising a first tongue, a first open end, and a first coupling end, the first coupling end being defined by a first flanged inner perimeter and a first outer perimeter, the first outer perimeter forming two aligning female gladhand couplers and one stabilizing female gladhand coupler;
a first electrical interface defined by a first lip and multiple first apertures, the first lip forming a sealed interface with the first flanged inner perimeter;
multiple first conduction members fitted into the first apertures;
a first cap mating with the first outer perimeter to cover the first electrical interface;
a vehicle mount comprising a second tongue, a second open end, and a second coupling end, the second coupling end being defined by a second flanged inner perimeter and a second outer perimeter, the second outer perimeter forming two aligning male gladhand couplers and one stabilizing male gladhand coupler,
whereby the pigtail interlocks with the vehicle mount when:
the aligning male gladhand couplers and the aligning female gladhand couplers are aligned, and
when the aligning female gladhand couplers are rotated between twenty degrees and twenty four degrees in a first direction until the stabilizing female gladhand coupler mates with the stabilizing male gladhand coupler;
a mounting plate attached to the second open end of the second tongue;
a second electrical interface defined by a second lip and multiple second apertures, the second lip forming a sealed interface with the second flanged inner perimeter;
multiple second conduction members fitted into the second apertures,
whereby the first and second conduction members align when the pigtail and the vehicle mount interlock;
a second cap mating with the second outer perimeter to cover the second electrical interface; and
a gated housing encapsulating the gladhand connection between the pigtail and vehicle mount, the gated housing defined by a first open end and an opposing second open end, the first open end comprising a hinged gate, the second open end comprising an aperture flange.

19. A gladhand electrical connectivity towing system, the system comprising:
a vehicle mount comprising a second tongue, a second open end, and a second coupling end, the second coupling end being defined by a second flanged inner perimeter and a second outer perimeter, the second outer perimeter forming two aligning male gladhand couplers and one stabilizing male gladhand coupler,
a mounting plate attached to the second open end of the second tongue;
a disc-shaped second electrical interface defined by a second lip and seven second apertures, the second lip forming a sealed interface with the second flanged inner perimeter;
seven second conduction members fitted into the second apertures, whereby the first and second conduction members align when the pigtail and the vehicle mount interlock; and a second cap mating with the second outer perimeter to cover the second electrical interface;

a mounting plate attached to the second open end of the second tongue;

a second electrical interface defined by a second lip and multiple second apertures, the second lip forming a sealed interface with the second flanged inner perimeter;

multiple second conduction members fitted into the second apertures; and a second cap mating with the second outer perimeter to cover the second electrical interface.

20. The system of claim 19, further comprising:

a pigtail comprising a first tongue, a first open end, and a first coupling end, the first coupling end being defined by a first flanged inner perimeter and a first outer perimeter, the first outer perimeter forming two aligning female gladhand couplers and one stabilizing female gladhand coupler;

a disc-shaped first electrical interface defined by a first lip and seven first apertures, the first lip forming a sealed interface with the first flanged inner perimeter;

seven first conduction members fitted into the first apertures;

a first cap mating with the first outer perimeter to cover the first electrical interface;

whereby the pigtail interlocks with the vehicle mount when:
 the aligning male gladhand couplers and the aligning female gladhand couplers are aligned, and
 when the aligning female gladhand couplers are rotated in a first direction until the stabilizing female gladhand coupler mates with the stabilizing male gladhand coupler;

whereby the first and second conduction members align when the pigtail and the vehicle mount interlock; and a gated housing encapsulating the gladhand connection between the pigtail and vehicle mount, the gated housing defined by a first open end and an opposing second open end, the first open end comprising a hinged gate, the second open end comprising an aperture flange.

* * * * *